(12) United States Patent
Shei

(10) Patent No.: US 7,911,940 B2
(45) Date of Patent: Mar. 22, 2011

(54) ADAPTIVE REDUNDANCY PROTECTION SCHEME

(75) Inventor: Yen H. Shei, Plano, TX (US)

(73) Assignee: Genband US LLC, Plano, TX (US)

( * ) Notice: Subject to any disclaimer, the term of this patent is extended or adjusted under 35 U.S.C. 154(b) by 704 days.

(21) Appl. No.: 11/240,317

(22) Filed: Sep. 30, 2005

(65) Prior Publication Data

US 2007/0076727 A1 Apr. 5, 2007

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)
- H04L 12/28 (2006.01)
- H04L 12/56 (2006.01)

(52) U.S. Cl. ........ 370/219; 370/223; 370/227; 370/228; 370/244; 370/245; 370/248; 370/389; 370/395.54; 370/401

(58) Field of Classification Search ........... 370/216–228
See application file for complete search history.

(56) References Cited

U.S. PATENT DOCUMENTS

| 5,818,842 | A |   | 10/1998 | Burwell et al. |
|---|---|---|---|---|
| 5,938,732 | A |   | 8/1999 | Lim et al. |
| 5,986,662 | A |   | 11/1999 | Argiro et al. |
| 6,052,733 | A | * | 4/2000 | Mahalingam et al. ........ 709/235 |
| 6,061,348 | A |   | 5/2000 | Castrigno et al. |
| 6,111,880 | A |   | 8/2000 | Rusu et al. |
| 6,229,538 | B1 | * | 5/2001 | McIntyre et al. ............. 715/734 |
| 6,272,113 | B1 |   | 8/2001 | McIntyre et al. |
| 6,308,282 | B1 | * | 10/2001 | Huang et al. ..................... 714/4 |
| 6,363,497 | B1 |   | 3/2002 | Chrabaszca |
| 6,381,218 | B1 |   | 4/2002 | McIntyre et al. |
| 6,512,774 | B1 | * | 1/2003 | Vepa et al. .................... 370/401 |

(Continued)

FOREIGN PATENT DOCUMENTS

EP 1 668 471 A2 4/2005

(Continued)

OTHER PUBLICATIONS

Hinden, R., "RFC3768—Virtual Router Redundancy Protocol (VRRP)", Internet RFC/STD/FYI/BCP Archives, Apr. 2004, 20 pages.

(Continued)

*Primary Examiner* — Daniel J Ryman
*Assistant Examiner* — Nishant B Divecha
(74) *Attorney, Agent, or Firm* — Jenkins, Wilson, Taylor & Hunt, P.A.

(57) ABSTRACT

A redundancy protection scheme comprises sending a protection packet from the primary network interface to the secondary network interface, the protection packet having a hardware address of the primary network interface as a source address and a hardware address of the secondary network interface as a destination address. The scheme further comprises determining whether the secondary network interface receives the protection packet from the primary network interface, operating the primary and secondary network interface as active and standby network interface in response to the secondary network interface receiving the protection packet, or operating both the primary and secondary network interface as active network interface in response to the secondary network interface not receiving the protection packet, and providing the hardware address of the active secondary network interface to devices coupled thereto.

16 Claims, 4 Drawing Sheets

U.S. PATENT DOCUMENTS

| | | | |
|---|---|---|---|
| 6,633,563 B1 | 10/2003 | Lin et al. | |
| 6,714,535 B1 | 3/2004 | Herh | |
| 6,728,780 B1 | 4/2004 | Hebert | |
| 6,738,826 B1 | 5/2004 | Moberg et al. | |
| 6,741,585 B1 | 5/2004 | Munoz et al. | |
| 6,754,745 B1 | 6/2004 | Horvath et al. | |
| 6,759,979 B2 | 7/2004 | Vashisth et al. | |
| 6,763,479 B1 | 7/2004 | Hebert | |
| 6,766,482 B1 | 7/2004 | Yip et al. | |
| 6,771,673 B1 | 8/2004 | Baum et al. | |
| 6,778,491 B1 | 8/2004 | Fourcand et al. | |
| 6,850,531 B1 | 2/2005 | Rao et al. | |
| 6,856,591 B1 | 2/2005 | Ma et al. | |
| 6,862,564 B1 | 3/2005 | Shue et al. | |
| 6,879,667 B1 | 4/2005 | Carew et al. | |
| 6,891,836 B1 | 5/2005 | Chen et al. | |
| 6,895,528 B2 | 5/2005 | Cantwell et al. | |
| 6,910,148 B1 | 6/2005 | Ho et al. | |
| 6,928,482 B1 | 8/2005 | Ben Nun et al. | |
| 6,938,092 B2 * | 8/2005 | Burns | 709/230 |
| 6,975,587 B1 | 12/2005 | Adamski et al. | |
| 7,177,943 B1 | 2/2007 | Temoshenko et al. | |
| 7,185,094 B2 | 2/2007 | Marquette et al. | |
| 7,212,519 B2 | 5/2007 | Johnson et al. | |
| 7,233,567 B1 | 6/2007 | Li | |
| 7,239,605 B2 | 7/2007 | Dinker et al. | |
| 7,263,060 B1 * | 8/2007 | Garofalo et al. | 370/217 |
| 7,289,487 B2 | 10/2007 | Jang | |
| 7,293,080 B1 | 11/2007 | Clemm et al. | |
| 7,424,025 B2 | 9/2008 | Qian et al. | |
| 2002/0012352 A1 | 1/2002 | Hansson et al. | |
| 2002/0016926 A1 | 2/2002 | Nguyen et al. | |
| 2002/0051464 A1 | 5/2002 | Sin et al. | |
| 2002/0191612 A1 | 12/2002 | Curtis | |
| 2003/0118039 A1 | 6/2003 | Nishi et al. | |
| 2003/0142795 A1 | 7/2003 | Gavette et al. | |
| 2003/0172319 A1 | 9/2003 | Ryhorchuk et al. | |
| 2003/0174729 A1 | 9/2003 | Heink et al. | |
| 2004/0008722 A1 | 1/2004 | Ellis et al. | |
| 2004/0030757 A1 | 2/2004 | Pandya | |
| 2004/0066782 A1 | 4/2004 | Nassar | |
| 2004/0071142 A1 | 4/2004 | Moriwaki et al. | |
| 2004/0131064 A1 | 7/2004 | Burwell et al. | |
| 2005/0053073 A1 | 3/2005 | Kloth et al. | |
| 2005/0185577 A1 | 8/2005 | Sakamoto et al. | |
| 2005/0243716 A1 | 11/2005 | Bitar et al. | |
| 2005/0281190 A1 * | 12/2005 | McGee et al. | 370/216 |
| 2006/0143309 A1 * | 6/2006 | McGee et al. | 709/250 |
| 2006/0268686 A1 | 11/2006 | Shei et al. | |
| 2007/0083528 A1 | 4/2007 | Matthews et al. | |
| 2007/0183314 A1 | 8/2007 | Li et al. | |
| 2008/0317055 A1 * | 12/2008 | Zetterlund et al. | 370/401 |
| 2009/0092044 A1 | 4/2009 | Saito | |

FOREIGN PATENT DOCUMENTS

| | | |
|---|---|---|
| WO | WO 2005/033889 A2 | 4/2005 |
| WO | WO 2006/128005 A2 | 11/2006 |

OTHER PUBLICATIONS

Final Official Action for U.S. Appl. No. 11/139,019 (Apr. 27, 2010).

Commonly-assigned, co-pending U.S. Appl. No. 12/700,444 for "Systems, Methods, and Computer Readable Media for Providing Instantaneous Failover of Packet Processing Elements in a Network," (Unpublished, filed Feb. 4, 2010).

Official Action for U.S. Appl. No. 11/702,009 (Jan. 13, 2010).

Non-Final Official Action for U.S. Appl. No. 11/139,019 (Oct. 28, 2009).

Official Action for U.S. Appl. No. 11/702,009 (Apr. 17, 2009).

Final Official Action for U.S. Appl. No. 11/139,019 (Mar. 23, 2009).

Interview Summary for U.S. Appl. No. 11/139,019 (Jan. 27, 2009).

Official Action for U.S. Appl. No. 11/240,317 (Jan. 26, 2009).

Communication pursuant to Rules 161 and 162 EPC for European Patent Application No. 04789383.9 (Sep. 24, 2008).

Official Action for U.S. Appl. No. 11/139,019 (Sep. 17, 2008).

Notification of Transmittal of the International Search Report and the Written Opinion of the International Searching Authority, or the Declaration for International Application No. PCT/US06/20456 (Oct. 20, 2006).

Communication pursuant to Rules 109 and 110 EPC for European Application No. 04789383.9 (Aug. 22, 2006).

Martini, et al. "Encapsulation Methods for Transport of ATM Over MPSL Networks," Network Working Group, Internet Draft, (Apr. 2005).

"FHRP—VRRP Enhancements," Cisco IOS Release 12.3(14)T, Cisco Systems, pp. 1-28 (Copyright 2005).

Yoo et al., "A Media Stream Processing of VoIP Media Gateway," IEEE, pp. 91-94 (2003).

Stern, et al. "Survivability: Protection and Restoration," Multiwavelength Optical Networks, p. 610-613, (May 1999).

Interview Summary for U.S. Appl. No. 11/319,019 (Aug. 31, 2010).

Notice of Allowance and Fee(s) Due for U.S. Appl. No. 11/702,009 (Sep. 20, 2010).

* cited by examiner

ADAPTIVE REDUNDANCY PROTECTION SCHEME

BACKGROUND

Traditional redundancy protection schemes in telecommunications systems provide a subset of standby or inactive resources for a subset of active resources. A common redundancy protection scheme is a 1:1 scheme where there is one standby resource for every active resource. In these systems, only the active resources are used to process or provide services to communication sessions. In a media gateway or another device coupled to an IP (Internet Protocol) network, a 1:1 redundancy protection scheme is often used to employ one active network interface card or resource and a standby network interface card or resource. These network interface cards couples the media gateway to the IP network, but only the active network interface card is carrying traffic. Although the active and standby network interface cards each has a unique hardware address, they share the same IP address. Because both the active network interface have its pathway to the IP network as well as a redundant pathway, it become desirable to be able to detect and recover from failures on the redundant pathway so that no data or voice traffic is lost.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
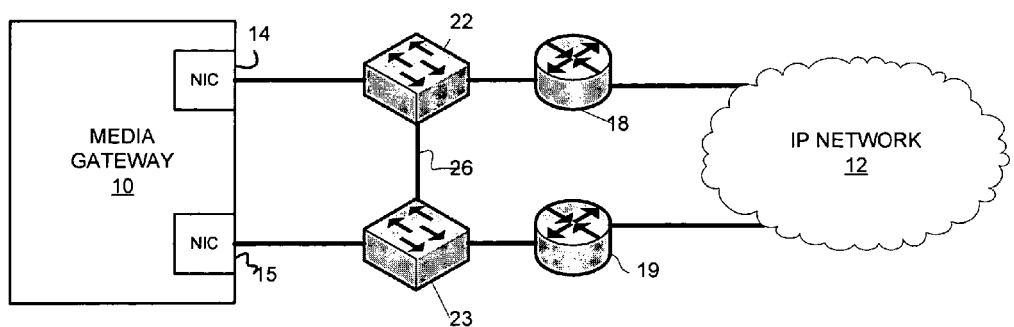
FIG. 1 is a simplified block diagram of an exemplary network topology for a media gateway coupled to an IP (Internet Protocol) network.

FIG. 1 is a simplified block diagram of an exemplary network topology for a media gateway 10 coupled to an IP (Internet Protocol) network 12. The media gateway 10 includes two network interface cards (NICs) or I/O cards 14 and 15 that are coupled to routers 18 and 19 via switches 22 and 23, respectively. The routers 18 and 19 are in turn coupled to IP network 12. The switches 22 and 23 are also coupled to each other via a cross-link 26. The cross-link 26 provides a redundant path from IP network 12 to each network interface card of the media gateway 10. The switches 22 and 23 may be Ethernet switches or switches of other appropriate types.

In typical operating modes where a 1:1 protection scheme is used, one of the network interface cards is designated as an active network interface 14 and the other network interface card is designated as a standby network interface 15. All traffic from the IP network 12 is routed via the switches 22 and 23 to the network interface card 14 functioning as the active network interface. The active network interface processes all of the traffic while the standby network interface is idle. Typically, the active network interface card has its own unique MAC (media access control) address, as does the standby network interface card. However, the network interface cards 14 and 15 of media gateway 10 share the same IP address.

It may be seen that if cross-link 26 coupled between switches 22 and 23 experiences a failure, then the traffic from router 19 that is coupled to standby network interface 15 will not be able to reach the media gateway's active network interface 14. Therefore, the timely detection of this cross-link failure in order to reconnect router 19 to the media gateway is of vital importance to avoid losing data. A method shown in FIG. 4 and described below provides an embodiment of a solution to this problem.

Figure 2:
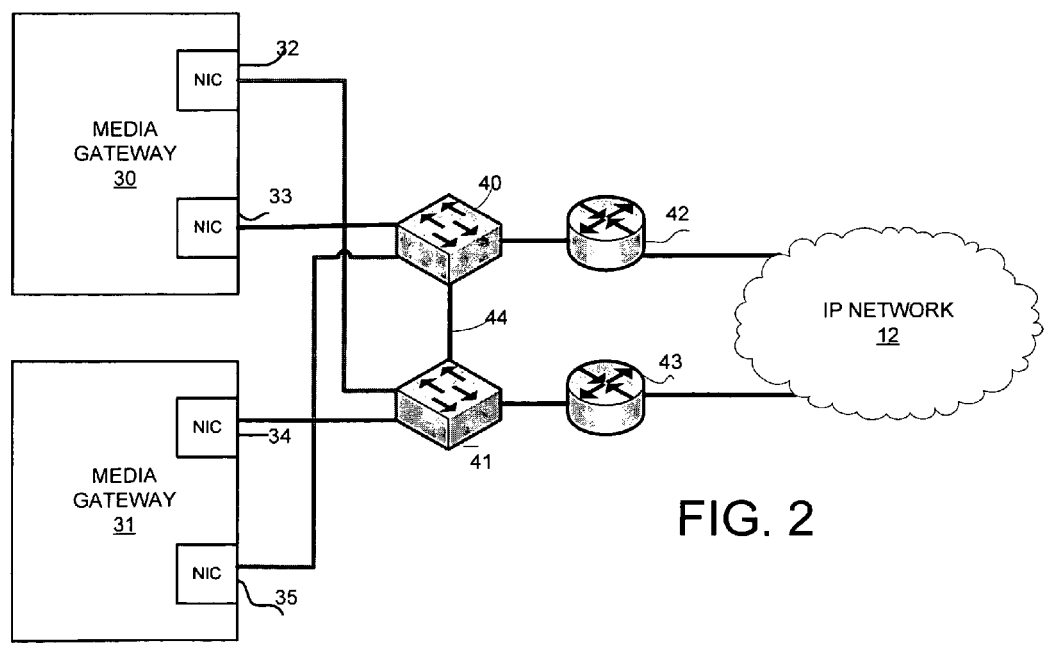
FIG. 2 is a simplified block diagram of another exemplary network topology for media gateways coupled to an IP (Internet Protocol) network.

FIG. 2 is a simplified block diagram of another exemplary network topology for media gateways 30 and 31 coupled to the IP network 12. The media gateway 30 includes network interface cards 32 and 33 coupled to switches 41 and 40 respectively. The media gateway 31 includes network interface cards 34 and 35 also coupled to switches 41 and 40 respectively. A cross-link 44 connects the two switches to provide redundant paths to each network interface card. As in the network topology described above, the network interface cards of each media gateway also operate in active and standby modes to provide 1:1 redundancy. If cross-link 44 fails, then the traffic carried by the router coupled to the standby network interface cards would not be able to reach the media gateway.

Figure 3:
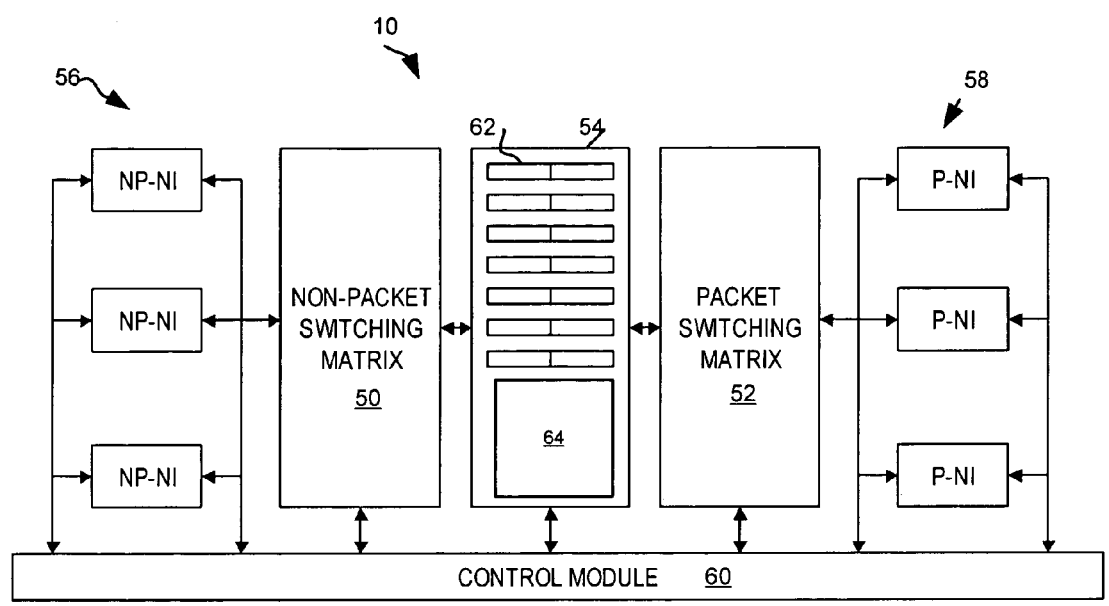
FIG. 3 is a simplified block diagram of an embodiment of a media gateway.

FIG. 3 is a more detailed block diagram of an embodiment of a media gateway 10. The media gateway 10 may be referred to herein as a network processing device. The media gateway may convert data from a format, protocol, and/or type required for one network to another format, protocol, and/or type required for another network, and/or otherwise convert data from a first type of data on a first transmission link to a second type of data on a second transmission link. The media gateway may terminate channels from a circuit-switched network and pass streaming media for a packet-switched network, such as real-time-transport-protocol (RTP) streams in an IP network. Input data for the media gateway may include audio, video, and/or T.120 (real-time multi-point communications), among others, which the media gateway may handle simultaneously or otherwise.

The switching matrices 50 and 52 are operable to switch data in a plurality of formats. The data passed between data transmission links by the switching matrices may include universal-mobile-telecommunications-service (UMTS) data, time-division-multiplexed (TDM) data, voice-over-internet-protocol (VoIP) data, asynchronous-transfer-mode (ATM) data, and voice-over-packet (VoP) data, for example. The switching matrices 50 and 52 are configured to perform circuit switching (e.g., TDM data circuit switching, among others), such as to obtain a physical path dedicated to a connection between two intermediate or end-points for the duration of the connection, including simultaneously performing packet switching (e.g., UMTS data packet switching, among others) to provide connectionless or non-dedicated communication. Virtual circuit switching may also be achieved via the switching matrices 50 and 52, such as may provide a dedicated logical connection which doesn't prevent sharing a physical path among multiple connections. Such virtual circuit switching may establish or support establishing a logical connection on a dedicated basis for some finite, predetermined or calculated duration, and may also support permanent virtual circuits which reserve the logical connection on an indefinite or ongoing basis.

The packet switching matrix 52 may receive packet signals from the P-NI 58, including packet signals from a variety of different types of packet signals, possibly including wireless packet signals. For example, the P-NI 58 may be configured to receive (and send) one or more of ATM signals, VoIP signals, and/or UMTS signals, among others. In some embodiments, a separate P-NI 58 may be employed for each type of packet signal that the media gateway 10 is intended or adapted to handle. For example, the media gateway 10 may include one or more P-NIs 58 dedicated to sending and receiving packet signals from one or more ATM networks, an additional one or more P-NIs 58 dedicated to sending and receiving packet signals from one or more VoIP networks, and an additional one or more P-NIs 58 dedicated to sending and receiving packet signals from one or more UMTS or other wireless networks. Each P-NI 58 employed in the media gateway 10 to send and receive packet signals from a wireless network may be or include a wireless network interface which may be substantially similar to the network interfaces described above, possibly including being configured to provide format, protocol, and signaling conversion between wireless signals and the packet signals.

In some embodiments, the NP-NI 56 may be configured to handle any type of non-packet data, including TDM and others, although in other embodiments the NP-NI 56 may be configured to handle only one or more certain types of non-packet data. Such limitations may result from specific design requirements or goals, customer specifications, application or environment demands or intricacies, manufacturing or market constraints, or other reasons. Similarly, the NP-NI 56 may also be configured to handle any one or more of various non-packet protocols, including GR-317, GR-394, GR-444, Q.931 PRI N12, DMS, 5ESS, D4, MF, DTMF, GR-303/NV5.2, TR08, among others.

The network interfaces may be implemented as a line-replaceable unit, such as a card, circuit board, or other module possibly having a standard and/or common interface with corresponding structure/electronics in the media gateway 10. The network interfaces may be configured to handle both inbound and outbound traffic. For example, the NP-NI 56 may receive data external to the media gateway 10, such as from a network to which the media gateway 10 is connected, and may also receive data internal to the media gateway 10. Consequently, the NP-NI 56 may also send data external to the media gateway 10, such as to a network connected thereto, and may also send data internal to the media gateway 10.

The non-packet switching matrix 50 is configured to receive TDM data and/or other non-packet data from one or more NP-NI 56. Consequently, the non-packet switching matrix 50 may transmit non-packet data after appropriate switching has been performed. One possible destination for data transmitted by the non-packet switching matrix 50 is a digital signal processing (DSP) resource or module 62 of the multi-service module 54, and/or one or more other components of the multi-service module 54.

The multi-service module 54 comprises a plurality of digital signal processing resources 62. The multi-service module 54 may be configured to receive packet data and non-packet data, or to receive data originating from both packet and non-packet data sources. The plurality of digital signal processing resources 62 may perform one or more digital data processing functions, such as voice encoding/decoding, echo cancellation, and signal conversion between one or more non-packet modes and/or one or more packet modes. For example, the digital signal processing resources 62 may perform the appropriate conversion between TDM, ATM, UMTS, and IP formats. The plurality of digital signal processing resources 62 of the multi-service module 54 may be embodied in hardware, software, and/or software. The plurality of digital signal processing resources 62 may comprise digital signal processing chips, field programmable devices, and/or other implementations.

The multi-service module 54 may also include a switching matrix 64 configured to handle non-packet data, such that TDM or other non-packet data switched by the non-packet switching matrix 50 may be directly communicated between the two switching matrices. In some embodiments, the switching matrix 64 integral to the multi-service module 54 may be configured to handle data from any data source, including non-packet data sources and packet data sources, although such data may require conversion to a common format prior to handling by the switching matrix 64 integral to the multi-service module 54.

After the multi-service module 54 completes any necessary, desired, or predetermined switching and/or other processing, the processed signal may be sent to one of the non-packet switching matrix 50 or the packet switching matrix 52 to complete the necessary switching. Moreover, the switching may be between any of possibly four or more wired and/or wireless sources, such as a UMTS data source, a VoIP data source, an ATM data source, and a TDM data source.

The control module 60 is configured to send and/or receive requests/messages from the multi-service module 54, the non-packet switching matrix 50, the packet switching matrix 52, and/or any of the network interfaces 56 and 58. The control module 60 may then process each request and determine an appropriate action, such as collecting data, allocating resources, among others, according to network conditions and predefined rules, among other possible considerations. In particular, the control module 60 is operable to instruct the network interface cards to switch between active and standby operational modes in response to network conditions or failures. For example, upon detecting that the cross-link between two switches coupled respectively to its network interface cards may instruct both network interface cards to operate in the active mode so that all traffic destined for the media gateway 10 can be received.

The present method may be employed in a system operating in a revertive or non-revertive protection mode. During normal operation, the primary interface operates as the active interface while the secondary interface operates as the standby interface. When a failure is detected on the primary interface, the secondary interface takes over as the active interface. In a system operating in a revertive protection mode, the primary interface is returned to active operations when the failure has been addressed and the primary interface becomes operational again. In a system operating in a non-revertive mode, the secondary interface continues to operate as the active interface even when the primary interface becomes operational.

Figure 4:
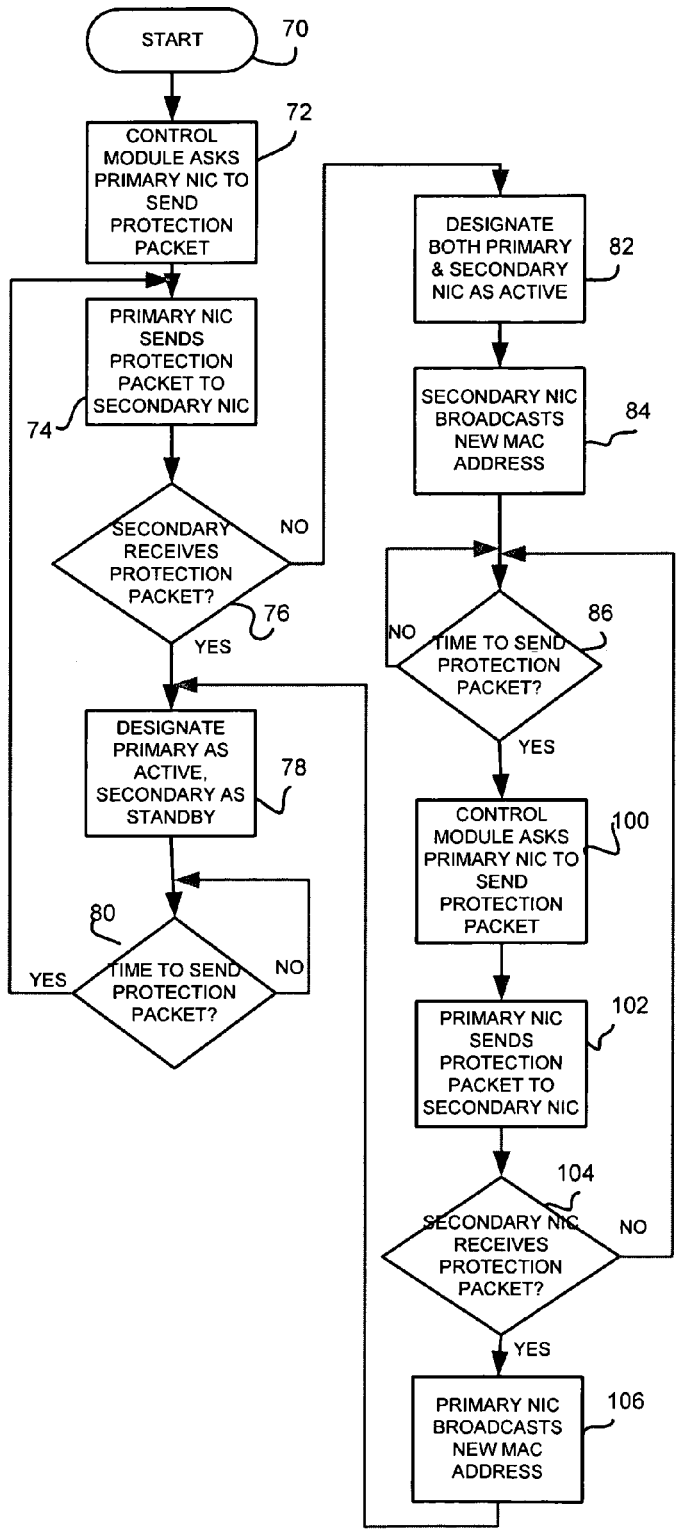
FIG. 4 is a simplified flowchart of an embodiment of a revertive method of determining failed redundant routes in the media gateway connectivity to the IP network.

FIG. 4 is a simplified flowchart of an embodiment of a revertive method 70 of determining failed redundant routes in the media gateway connectivity to the IP network. In the media gateway 10, one of the network interface cards is always designated as the primary network interface 14 and the other is always designated as the secondary network interface 15. In step 72, the control module 60 (FIG. 1) instructs the primary network interface card 14 to send a redundancy protection packet hereinafter also referred to as a protection packet. In step 74, the primary network interface 14 sends the protection packet to the secondary network interface card 15 via the switches 22 and 23 and the cross-link 26. The protection packet is sent via a unicast mechanism. The protection packet may be configured with the MAC address of the primary network interface 14 in the source MAC address field and the MAC address of the secondary network interface 15 in the destination MAC address field. The protection packet may additionally include the hardware identifiers (ID) of the source and destination network interface cards. The hardware ID may be indicative of the shelf/frame location of the network interface card. The content of the protection packet may be proprietary, standard or don't care since the control module 60 may recognize the protection packets by the network interface addresses in the source and destination MAC addresses. However, a predetermined bit pattern or other data may be in the header or body of the packet that designates it as a protection packet. The MAC address is but one example of a hardware address or some unique address that identifies a network interface card, and other types of addresses may be used if suitable.

A determination is made at the control module 60 (or by the secondary network interface 15) whether the protection packet has been received by the secondary network interface 15 in step 76. If the secondary network interface 15 receives the protection packet, then control module 60 designates the primary network interface 14 to operate as the active network interface and the secondary network interface 15 to operate as the standby network interface in step 78. The condition of the cross-link 26 is then continuously monitored by sending additional protection packets periodically in step 80. In step 80, a determination is made as to whether the time interval for sending another protection packet has passed. The time interval for sending the protection packets may be determined by QoS (quality of service) or other requirements so as to avoid data loss, or other disruptions in service.

If in step 76 the secondary network interface 15 does not receive the protection packet from the primary network interface 14, such as when a predetermined timer runs out before the protection packet is received, then the control module 60 designates both the primary and the secondary network interfaces as active network interfaces in step 82. In step 84, the secondary network interface then broadcasts or sends a message with its MAC address and the IP address it shares with the primary network interface in the appropriate sender fields to devices coupled thereto. Therefore, router 19, upon receiving the message from secondary network interface, now has its MAC address and can now transmit data directly to it. The message sent out by the secondary network interface may be a gratuitous address resolution protocol (ARP) message, another standard message, or a message with a proprietary format and content. In step 86, the control module 60 checks to see if it is time to send another protection packet. If not, it performs other tasks until it is time to send a protection packet.

If it is time to send a protection packet in step 86, then the method varies slightly for a system that is in the revertive protection mode or the non-revertive protection mode. The protection mode may be user-configurable or preset, depending on the application or other conditions. When operating in the revertive protection mode, the system will always revert back and designate the primary as the active network interface if the primary network interface is operational.

If the system is operating in the revertive protection mode, then in step 100 the control module 60 asks only the primary network interface card 14 to send a protection packet. In step 102, the primary network interface card 14 sends the protection packet. The protection packet is sent via a unicast mechanism. In step 104, a determination is made as to whether the secondary network interface 15 received the protection packet. If the secondary network interface card 15 did not receive the protection packet after a predetermine amount of time has elapsed, then it is indicative that the cross-link 26 is still broken and that the network interface cards should remain in the protection mode. The control module 60 will continue to ask the primary network interface card 14 to send the protection packets when in step 86 a determination is made that the time interval for sending the protection packets has elapsed. If in step 104 a determination is made that the secondary network interface card received the protection packet, then the network interface cards are to be reverted back to the original active-standby configuration in steps 106 and 78. In step 106, the primary network interface card broadcasts its MAC or hardware address and in step 78, the primary network interface card is re-designated as the active interface and the secondary network interface card as the standby interface. If at step 104 the secondary network interface card does not receive the protection packet, then the control module 60 performs other tasks and continues to check the time interval for sending the protection packet in step 86.

Figure 5:
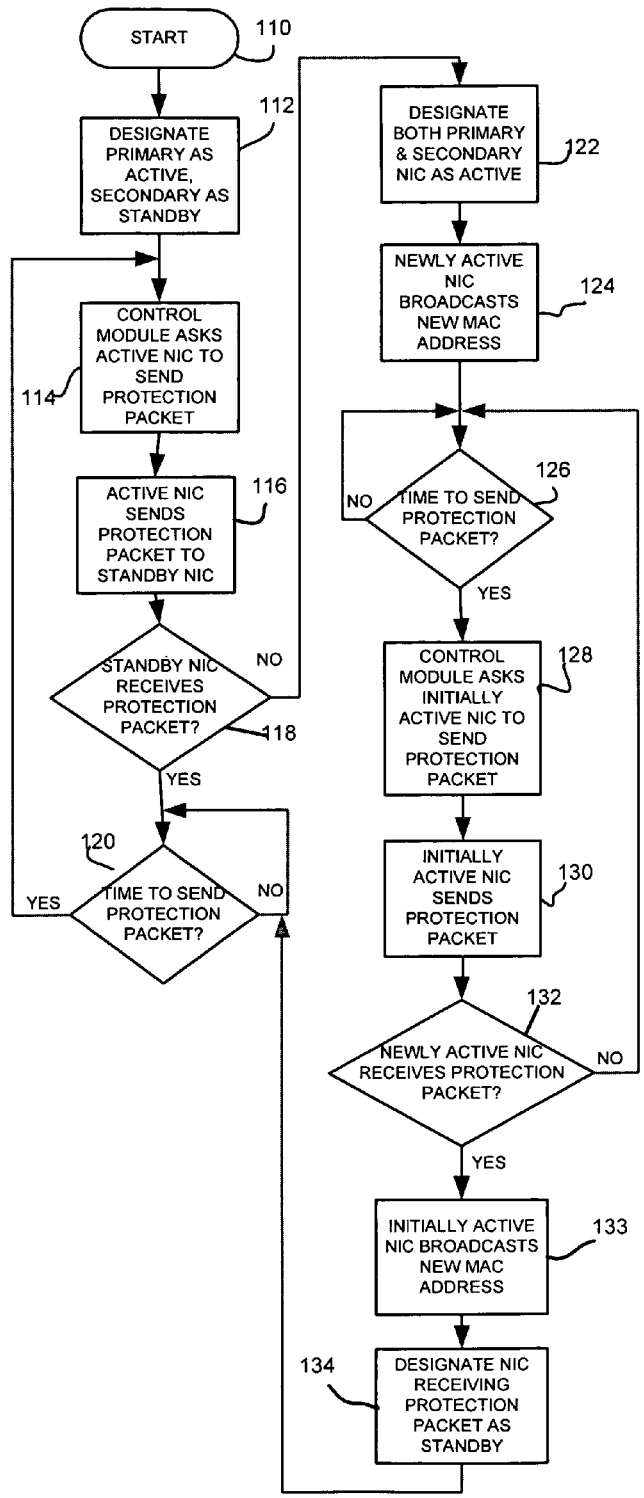
FIG. 5 is a simplified flowchart of an embodiment of a non-revertive method of determining failed redundant routes in the media gateway connectivity to the IP network.

If the system is operating in the non-revertive protection mode, an embodiment of this process 110 is shown in FIG. 5. In step 112, the control module 60 designates the primary network interface 14 to operate as the active network interface and the secondary network interface 15 to operate as the standby network interface. This active-standby designation may be done after a determination that both interface cards as well as the cross-link therebetween are operational. The condition of the cross-link 26 is then continuously monitored by sending additional protection packets periodically. In step 114, the control module sends a request to the active network interface card to send a protection data packet, and in step 116, the active network interface card sends a protection data packet to the standby network interface card. The protection packet is sent via a unicast mechanism. A determination is then made as to whether the standby network interface card has received the protection packet in step 118. If the protection packet was received, the process of sending periodic protection packets continues. A determination is made as to whether the time interval for sending another protection packet has passed in step 120. The time interval for sending the protection packets may be determined by QoS (quality of service) or other requirements so as to avoid data loss, or other disruptions in service. Then the process returns to step 114.

If in step 118 the standby network interface card does not receive the protection packet from the active network interface, such as when a predetermined timer runs out before the protection packet is received, then the control module 60 designates both the primary and the secondary network interfaces as active network interfaces in step 122. The network interface that has been transmitting the protection packets are hereinafter referred to as an "initially active network interface" or "initially active NIC," and the network interface that has been monitoring and receiving the protection packets are hereinafter referred to as a "newly active network interface" or "newly active NIC." In step 124, the newly active network interface then broadcasts or sends a message with its MAC or hardware address and the IP address it shares with the primary network interface in the appropriate sender fields to devices coupled thereto. The message sent out by the newly active network interface may be a gratuitous address resolution protocol (ARP) message, another standard message, or a message with a proprietary format and content. Therefore, both network interfaces are actively receiving, transmitting and processing data packets and enabling the bypass of the broken cross-link. In step 126, the control module 60 checks to see if it is time to send another protection packet. If not, it performs other tasks until it is time to send a protection packet.

If it is time to send another protection packet, then in step 128 the control module 60 asks the initially active network interface to send a protection packet, and in step 130, the initially active network interface card sends the protection packet to the newly active network interface. If the cross-link 26 is still broken, then the protection packets would not reach their destination and the newly network interface card would not receive the protection packets as determined in step 132. If the newly active network interface does not receive the protection packet, then both interface cards remain in the active operating mode and execution proceeds to step 126. If the cross-link 26 has been repaired and the newly active network interface did receive the protection packet from the initially active network interface, then the initially active network interface card broadcasts its MAC or hardware address in step 133. In step 134, the control module designates the newly active network interface as the standby and execution loops back to step 120.

In general, in the non-revertive mode, the network interface card sending the protection packets will continue to send the protection packets and the other network interface card continues to monitor for the protection packets. If the network interface card that was sending the protection packets become operationally disabled, then the other network interface card would transition as the active network interface and send the protection packets. When the disabled network interface card recovers, it continues to monitor for the protection packets and the roles of the two network interface cards do not revert back to the original state.

As seen above, the control module 60 may play a major role in the determination of the failed cross-link and/or in the recovery process. Alternatively, the network interface cards may possess sufficient intelligence or logic to make such determinations and switch operating modes appropriately. Although the present disclosure is described in the context of a media gateway and network interface cards, the method and system described herein are applicable to other telecommunication and/or networking devices with an I/O card redundancy protection scheme.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for adaptive redundancy protection, the method comprising:
    at a network processing device connected to an Internet protocol (IP) network and including a primary network interface card and a secondary network interface card, the primary network interface card being connected to the network via a first path using a first Ethernet switch and the secondary network interface card being connected to the network via a second path using a second Ethernet switch, wherein the first path includes a first router connecting the first Ethernet switch to the IP network and the second path includes a second router for connecting the second Ethernet switch to the IP network, the primary network interface card being connected to the secondary network interface card via a cross-link coupling the Ethernet switches so as to provide a redundant pathway from the network to each of the primary and secondary network interface cards:
    sending a protection packet from the primary network interface card of the network processing device to the secondary network interface card of the network processing device using the cross-link, the protection packet having a hardware address of the primary network interface card as a source address and a hardware address of the secondary network interface card as a destination address;
    determining whether the secondary network interface card receives the protection packet from the primary network interface card;
    operating the primary network interface card as an active network interface card and the secondary network interface card as a standby network interface card in response to the secondary network interface card receiving the protection packet, wherein operating as an active network interface card includes transmitting, receiving, and processing data packets from the network and wherein operating as a standby network interface card includes not transmitting, receiving, or processing data packets from the network;
    operating both the primary and secondary network interface cards as active network interface cards, wherein the primary network interface card can send and receive packets to and from the network using the first path and the secondary network interface card can send and receive packets to and from the network using the second path, and bypassing the cross-link in response to the secondary network interface card not receiving the protection packet; and
    providing the hardware address of the active secondary network interface card to devices coupled thereto, wherein the primary and secondary network interface cards are components of a media gateway and wherein a control module within the media gateway instructs the primary and secondary network interface cards to operate as active network interface cards in response to the secondary network interface card not receiving the protection packet.

2. The method of claim 1, wherein providing the hardware address of the secondary network interface card comprises sending a gratuitous ARP message.

3. The method of claim 1, further comprising:
    sending a protection packet from both active network interface cards periodically; and
    determining whether one of the active network interface cards receives the protection packet.

4. The method of claim 1, further comprising:
    sending a protection packet from the primary network interface card periodically; and
    determining whether the secondary active network interface card receives the protection packet.

5. The method of claim 4, further comprising reverting the secondary network interface card to operate as a standby network interface card in response to the secondary network interface card receiving the protection packet.

6. The method of claim 4, further comprising maintaining the secondary network interface card as the active network interface card and the primary network interface card as the standby network interface card in response to the secondary network interface card receiving the protection packet.

7. The method of claim 1, wherein sending a protection packet from the primary network interface card to the secondary network interface card comprises the protection packet having a hardware ID of the primary network interface card and a hardware ID of the secondary network interface card.

8. A redundancy protection method, the method comprising:
at a media gateway connected to an Internet protocol (IP) network including a first and a second Ethernet network interface card, the first Ethernet network interface card being connected to the network via a first path using a first Ethernet Switch and the second Ethernet network interface card being connected to the network via a second path using a second Ethernet switch, wherein the first path includes a first router connecting the first Ethernet switch to the IP network and the second path includes a second router for connecting the second Ethernet switch to the IP network, the first Ethernet network interface card being connected to the second Ethernet network interface card via a cross-link coupling to the Ethernet switches so as to provide a redundant pathway from the network to each of the first and second Ethernet network interface cards:
designating the first and second Ethernet network interface cards as primary and secondary network interface cards respectively;
instructing the primary network interface card to send a protection packet to the secondary network interface card via the cross-link, the protection packet having a MAC address of the primary network interface card as a source address and a MAC address of the secondary network interface card as a destination address;
determining whether the secondary network interface card receives the protection packet from the primary network interface card;
operating the primary network interface card as an active network interface card and the secondary network interface card as a standby network interface card in response to the secondary network interface card receiving the protection packet, wherein operating as an active network interface card includes transmitting, receiving, and processing data packets from the network and wherein operating as a standby network interface card includes not transmitting, receiving, and processing data packets from the network;
operating both the primary and secondary network interface cards as active network interface cards, wherein the primary network interface card can send and receive packets to and from the network using the first path and the secondary network interface card can send and receive packets to and from the network using the second path, and bypassing the cross-link in response to the secondary network interface card not receiving the protection packet; and
providing the MAC address of the active secondary network interface card to devices coupling the active secondary network interface card to the network, wherein the primary and secondary network interface cards are components of the media gateway and wherein a control module within the media gateway instructs the primary and secondary network interface cards to operate as active network interface cards in response to the secondary network interface card not receiving the protection packet.

9. The method of claim 8, wherein providing the MAC address of the secondary network interface card comprises sending a gratuitous ARP message to devices coupling the active secondary network interface card to the network.

10. The method of claim 8, further comprising:
instructing both active network interface cards to send a protection packet to each other periodically; and
determining whether either active network interface card receives the protection packet wherein the received protection packet is sent from the other network interface card.

11. The method of claim 8, further comprising:
instructing the primary network interface card to send a protection packet periodically; and
determining whether the secondary active network interface card receives the protection packet.

12. The method of claim 11, further comprising reverting the secondary network interface card to standby mode in response to the secondary network interface card receiving the protection packet.

13. The method of claim 8, wherein providing the MAC address of the active secondary network interface card to devices coupling the active secondary network interface card to the network comprises providing the MAC address of the active secondary network interface card to a router coupled to the active secondary network interface card.

14. The method of claim 8, further comprising sending the protection packet via unicast mechanism.

15. The method of claim 8, further comprising maintaining the secondary network interface card as the an active network interface card and the primary network interface card as the standby network interface card in response to the secondary network interface card receiving the protection packet.

16. A network processing device comprising:
primary and secondary network interface cards, the primary network interface card being connected to an Internet protocol (IP) network via a first path using a first Ethernet switch and the secondary network interface card being connected to the network via a second path using a second Ethernet switch, wherein the first path includes a first router connecting the first Ethernet switch to the IP network and the second path includes a second router for connecting the second Ethernet switch to the IP network, the primary network interface card being connected to the secondary network interface card via a cross-link coupling to the Ethernet switches so as to provide a redundant pathway from the network to each of the primary and secondary network interface cards; and
the primary network interface card being operable to periodically send a protection packet having a hardware address of the primary network interface card as a source address and a hardware address of the secondary network interface card as a destination address, and operating the primary network interface card as an active network interface card and the secondary network interface card as a standby network interface card in response to the secondary network interface card receiving the protection packet, wherein operating as an active network interface card includes transmitting, receiving, and processing data packets from the network and wherein operating as a standby network interface card includes not transmitting, receiving, and processing data packets from the network, or operating both the primary and secondary network interface cards as active network interface cards, wherein the primary network interface card can send and receive packets to and from the network using the first path and the secondary network interface card can send and receive packets to and from the network using the second path, and bypassing the cross-link in response to the secondary network interface card not receiving the protection packet, and providing the hardware address of the active secondary network interface card to the second router coupled thereto, wherein the primary and secondary network interface cards are components of a media gateway and wherein a control module within the media gateway instructs the primary and secondary network interface cards to operate as active network interface cards in response to the secondary network interface card not receiving the protection packet.

* * * * *